Aug. 11, 1953  J. W. SHAMEL  2,648,761
STREET BARRICADE LIGHT SECURING MEANS
Filed Sept. 28, 1951  4 Sheets-Sheet 1
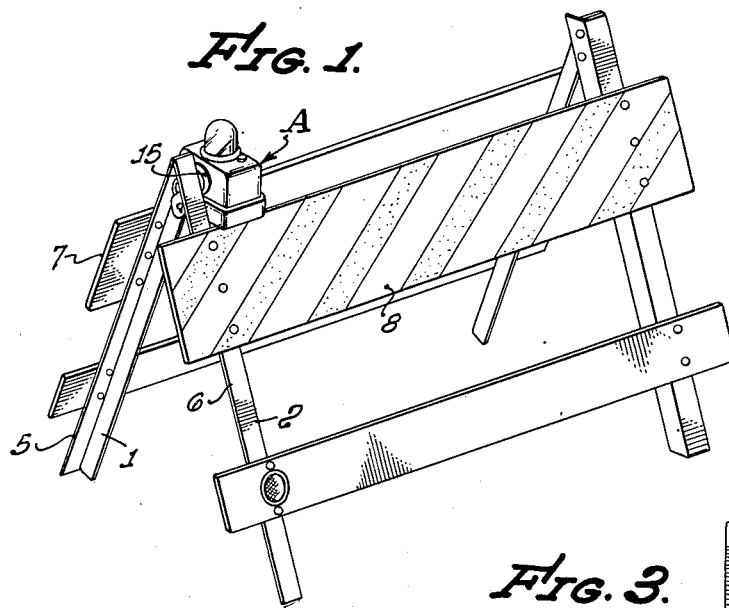
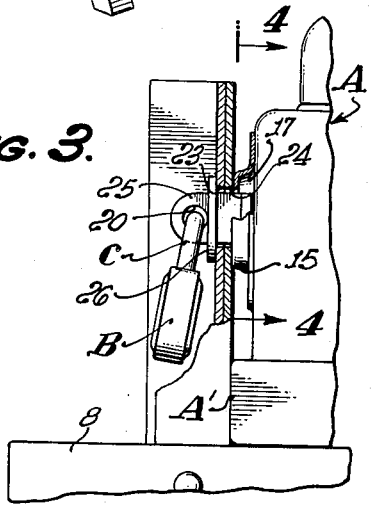
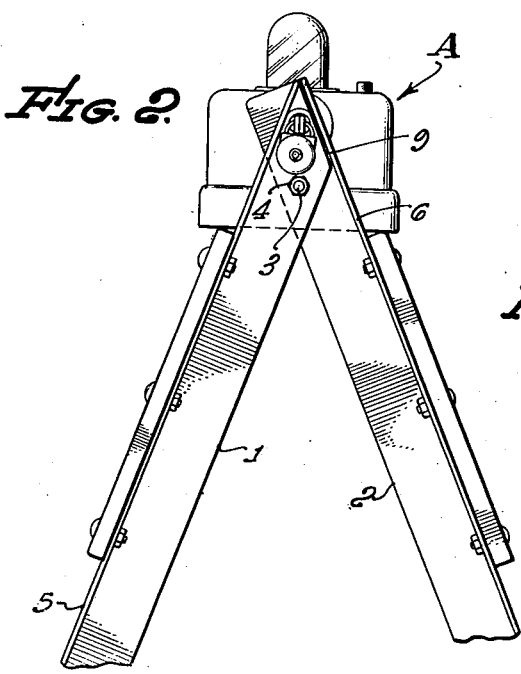
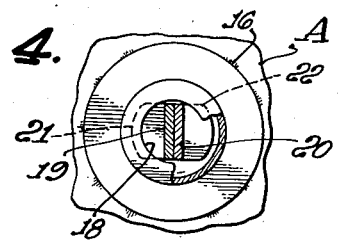
INVENTOR.
JOHN W. SHAMEL,
BY
O. O. Martin
ATTORNEY.

Aug. 11, 1953 J. W. SHAMEL 2,648,761
STREET BARRICADE LIGHT SECURING MEANS
Filed Sept. 28, 1951 4 Sheets-Sheet 2

JOHN W. SHAMEL,
INVENTOR.

BY
*O O Martin*
ATTORNEY.

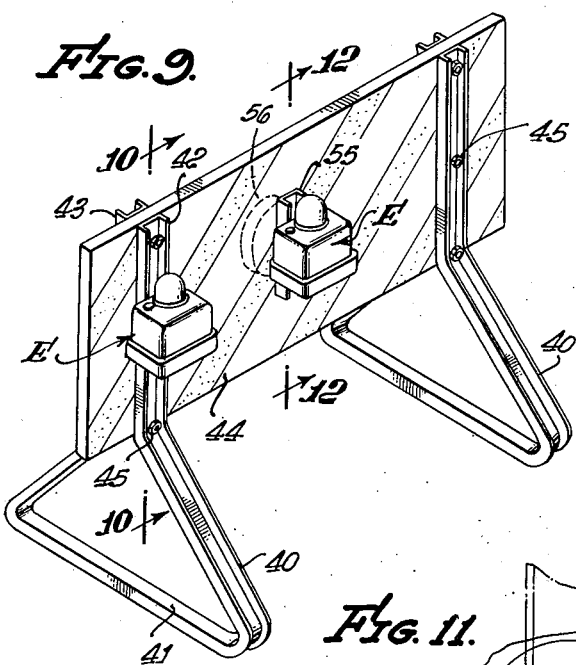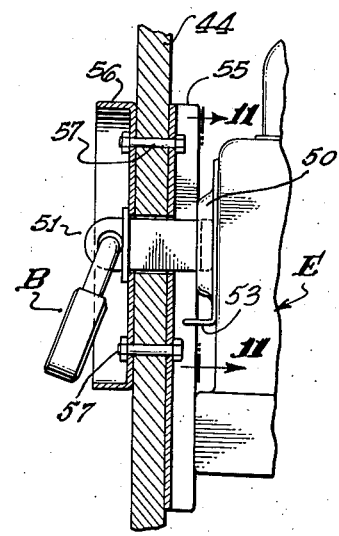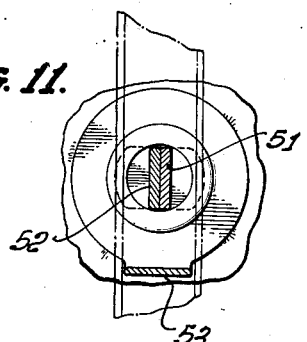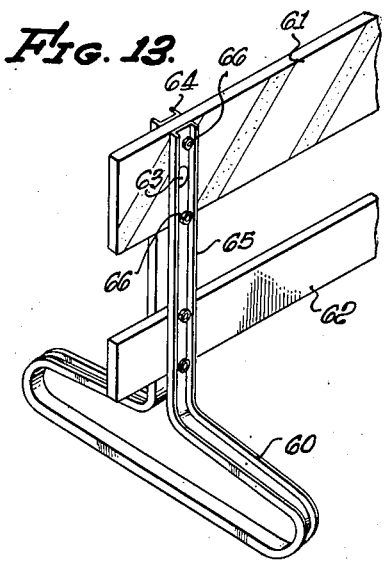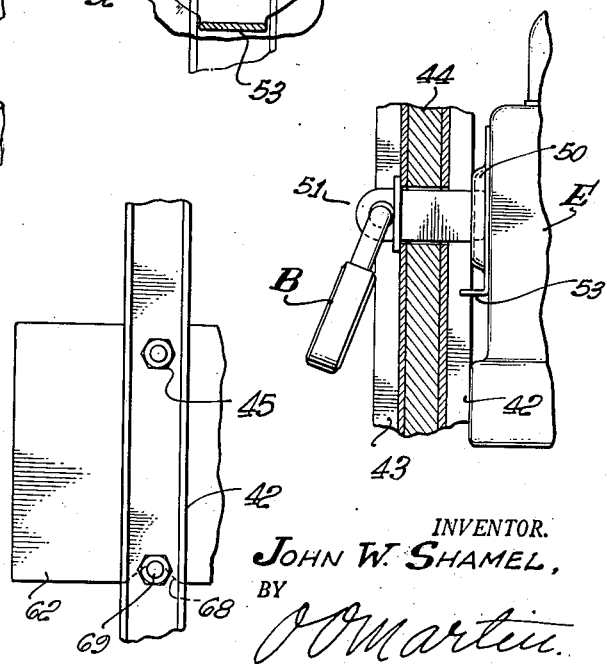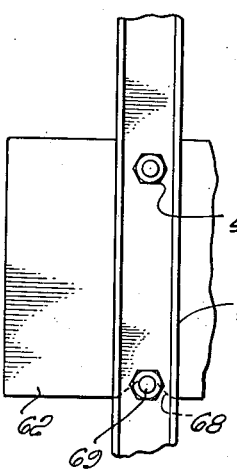

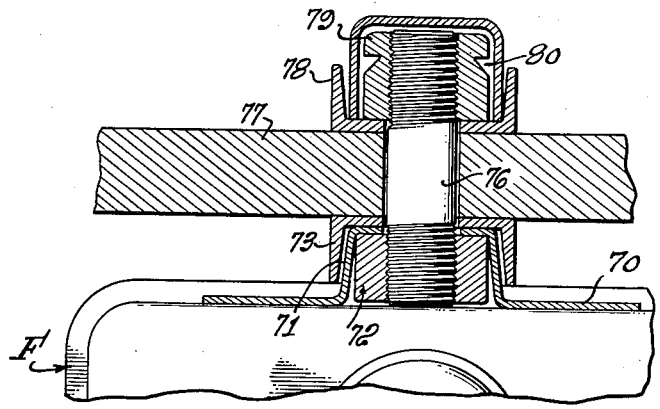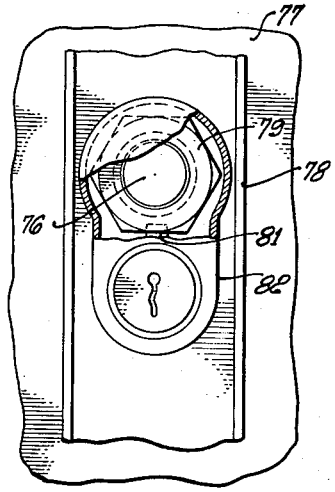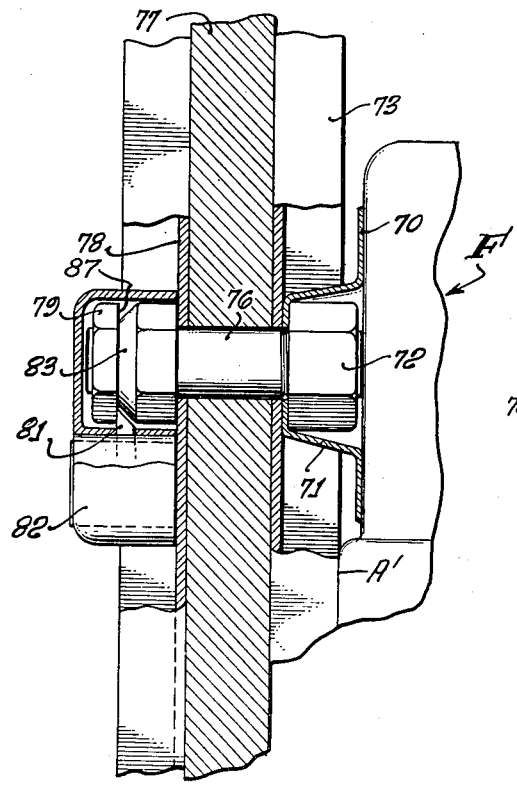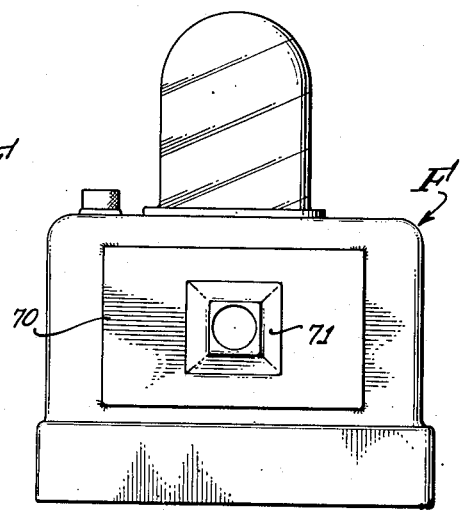

Patented Aug. 11, 1953

2,648,761

UNITED STATES PATENT OFFICE 2,648,761

STREET BARRICADE LIGHT SECURING MEANS

John W. Shamel, Los Angeles, Calif.

Application September 28, 1951, Serial No. 248,706

5 Claims. (Cl. 240—2)

This invention relates to barricades such as commonly used on streets and highways to give warning to the public that men are at work on the street or highway, or that the road is closed for repairs.

In connection with such barricades, it is customary to place lanterns or flares on the ground in front of the barricades to offer increased warning during the night but such signal devices and this manner of placing these devices relative to the barricades have not been found entirely satisfactory. Lately, far more efficient warning lights have been developed and it has been found advantageous to mount these lights directly on the barriers. However, because such improved lights are much more efficient, more attractive and easily converted to other purposes, it has been found that the temptation to remove the lights from the barriers and to carry them away is too great and that the loss of lights, together with the impaired efficiency of the signaling devices due to the absence of these lights has become a serious problem in the use of such barricades. It is in view of the foregoing the object of the present invention is to provide simple and dependable means for locking such signal lights in position on barricades. With this object in view the invention consists in the combinations and features hereinafter fully described and drawings are hereto appended in which preferred forms of the invention are illustrated. In the drawings:

Fig. 1 is a perspective view of a barricade illustrating the manner in which a signal light is mounted in position thereon according to the present invention;

Fig. 2 is a substantially corresponding view of one end of the barricade with the signal light in position thereon;

Figs. 3 and 4 are fragmentary views, on a larger scale, of parts thereof;

Figure 9 shows a modification of the invention in which the barricade is in the form of a single panel supported by channels which are flared out at the bottom to form a stable base.

Figure 10 is a sectional view taken on line 10—10 in Figure 9. Figure 11 is a side view of the channel and protruding elements shown in Figure 10.

Figure 12 is a sectional view taken from line 12—12 of Figure 9.

Figure 13 is a further modification of the barricade of Figure 9, with two panels rather than one. In Figure 14 is shown a modification of the panel securing means.

Figure 15 is an end view of the preferred embodiment of the invention. Figure 16 is a top, or plan, sectional view illustrating the mode of securing this preferred embodiment to a barricade.

Figure 17 is an elevation of a sectional view of the preferred embodiment secured to a barricade.

Figure 18 is an enlarged end view of the locking means shown in elevation in Figure 17.

Figure 5:
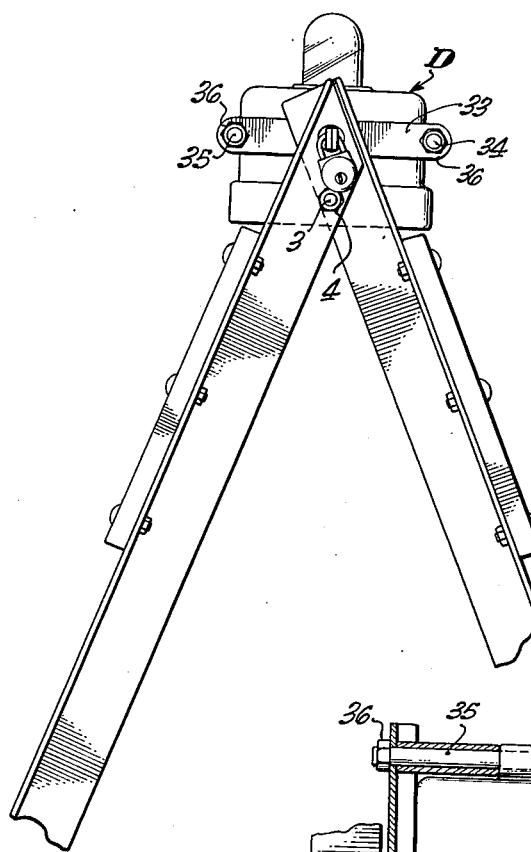
Fig. 5 is a similar end view of the barricade including a signal light fitted with a modified form of device for mounting the light in position on the barricade.
Figure 6:
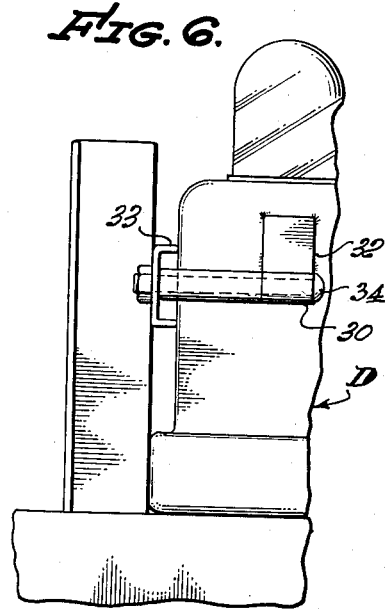
Figs. 6 and 7 are fragmentary side elevational views on a larger scale of one end of the barricade to which a signal light is secured by means of the devices indicated in Fig. 5.
Figure 8:
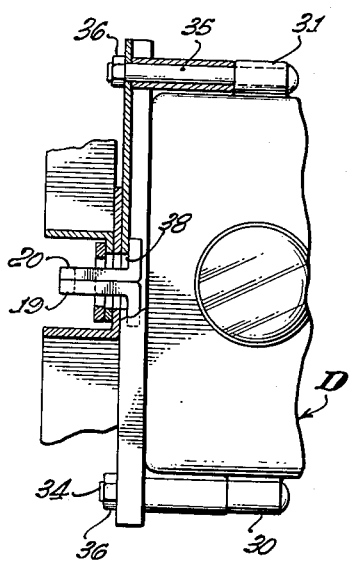
Fig. 8 is a substantially corresponding plan view with a portion of the barricade and the signal supporting means broken away for the sake of clearness.
Figure 7:
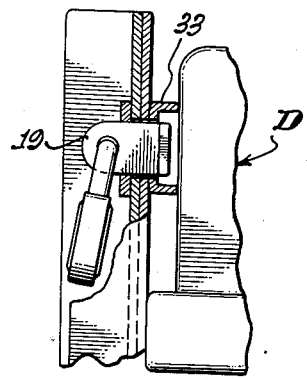

The barricade shown in Figs. 1 to 4 of the drawings includes at each end thereof a pair of legs in the form of angle irons 1, 2 which are pivotally joined as 3 by means of a bolt or rivet 4 extending through the webs thereof. The flanges 5, 6 of these angle irons project outwardly to form bases on which conventional panels 7, 8 are mounted in position. The web 1 is at the top thereof cut back to form an inclined end surface 9 coming to rest against the flange 6 of the leg 2 when the barricade is placed in upright operative position.

The signal light shown in the drawings includes a casing A to the side of which a circular bracket 15 is rigidly secured, as by a welding operation, substantially as indicated at 16 in Fig. 4. The center portion of this bracket is offset to provide between the bracket and the side surface of the light casing a space 17 and this offset portion is at 18 shown perforated to provide a seat for a pair of fastening elements 19, 20. These elements are L-shaped, each having a flange coming to rest against the inner surfaces of the bracket when inserted therein through the perforation 18 causing the flanges of the elements to take the position within the perforation 18, substantially as indicated in dotted outline at 21, 22 in Fig. 4. When the elements have been placed in position in the manner just explained, they are pushed through perforations 23, 24 of the webs of the legs, whereupon the bow C of a padlock B is pushed through perforations 25 of the elements to lock the casing of the light securely in position on the barricade. It is to be understood that the parts should be so proportioned that the casing of the signal light will be held tightly against the webs of the legs and it is for this reason important to note that the offset portion of the bracket 15 is of the same width as the projecting portion $A^1$ of the base of the light. When so proportioned it is found that the padlock will maintain the light snugly in position against the webs of the legs. It may be found advantageous to place a washer 26 behind the bow of the padlock in order to afford a better contact surface for this part.

It was above stated that it is the object of the invention to provide means for fastening a signal light securely in position on a barricade. When the bracket 15 and the elements 19, 20 are made from steel of high enough temper to withstand ordinary hack saws or files, it is seen that it is not an easy matter to remove the signal light, at least without at the same time damaging the barricade. If danger is present that the hardened elements might be broken by blows of a hammer, it would be advantageous to make one element hard and to leave the other element soft. If then one should break, the other would still hold.

While the principal object of the invention is to provide simple and dependable means for locking signal lights in position on barricades, the physical structure which has been developed to achieve this object has several inherent advantages. In Figs. 2 and 5, bolt 4 through the webs of the legs maintains the barricade in upright position. If the light is not locked in position, it is possible to fold up the barricade and remove it rather readily. However, with the light locked in position as shown in Figures 2 and 5 not only is access to bolt 4 difficult, but the light securing means itself prevents folding of the barricade legs. This makes the barricade rather unwieldly, and use of the device has shown that the clumsiness of the barricades when locked in open position is a strong deterrent to theft of the barricades, even with the added attraction of the attached lights.

While the signal light, in the manner above described, may be securely held in position to prevent removal by the ordinary, untrained passerby, it becomes necessary to provide means for maintaining the signal light in upright position on the barricade. This may be done merely by placing the panels 7, 8 at such a height that the bottom surface of the light casing comes to rest thereon, substantially as indicated in Figs. 1 and 2.

A modified form of signal light securing means is, in Figs. 5 to 8, shown to comprise tubular lugs 30, 31, which are rigidly secured to the end surfaces of the light casing D in any suitable manner, as by welding operation indicated at 32. A channeled bar 33 is mounted on the side of the casing and this bar is perforated at the ends thereof to receive bolts 34, 35, which are seated in the lugs 30, 31 tightly to clamp the bar in position on the casing. While this manner of securing the parts together may be found sufficient to prevent the ordinary, untrained intruder from removing the signal light it is, of course, a simple matter similarly to weld the channel bar in position on the casing and the nuts 36 in position on the bolts.

A perforation 38 is cut through the center of the channel bar of a size to receive therein the elements 19, 20, or other similar elements, whereupon the casing assembly is mounted on the legs of the barricade in the manner above described.

A different type of barricade is in Fig. 9 shown to consist of a pair of channel iron legs 40 having broad bases 41 from which the material of the legs is upwardly and inwardly directed; the upper half portion of the legs being vertically directed to form flanges 42, 43 between which the single panel 44 is held rigidly clamped in position by means of bolts 45. The light casing E is, in this case, fitted on one side thereof with a circular bracket 50 which is substantially like the bracket 15 of Fig. 1. A pair of similar L-shaped elements 51, 52 are in like manner seated within this bracket and they are long enough to extend through the flanges 42, 43 of the legs and through the panel 44. A similar padlock is used to clamp the light casing snugly against the legs of the barricade. But since the single panel 44 cannot be depended upon to maintain the light casing in upright position it becomes necessary to provide other means for this purpose, such as a lip 53 of the bracket 50 projecting into the space within the channel 42 of the leg. When this lip is of a width snugly to fit within this channel, it is found that the light will be maintained firmly in position.

As indicated in Fig. 9, the light E may be placed on the panel, intermediate the legs thereof, if preferred. For this purpose, a short channel 55 is placed against the panel and a cup-shaped member 56 rests against the rear surface of the panel, see also Fig. 12. Bolts 57 draw these parts rigidly in position against the panel and the padlock B maintains the light casing firmly in position.

A different form of barricade leg 60 is illustrated in Fig. 13. This leg is designed to support two panels 61, 62 in vertically spaced relation to each other. The panel 61 and the vertically extending portions 64, 65 of the leg are, intermediate the bolts 66 by means of which the panel is clamped in position, at 63 shown perforated to receive the L-shaped elements 51, 52 to provide a light assembly as indicated in Fig. 10. But the light may, of course, be mounted on the panel intermediate the legs, as illustrated in Fig. 12.

Fig. 14 is added to indicate that the panel 62, or all of the panels 44, 61 and 62 may be notched at 68 to receive the lowermost bolt 69 of this panel. This arrangement will materially facilitate the assembling and disassembling operations of the barricades.

In the modification illustrated in Figs. 15 to 18, the light casing F may remain unchanged, but the offset portion 71 of the bracket 70 has in this case been squared to form a seat for snugly receiving a threaded nut 72. It is also important to note that this offset portion of the bracket is of a width to fit snugly within the flanges 73, 74 of one upper end of the channeled barricade leg. A threaded rod 76 engages the nut 72 and the outer end of this rod extends through the panel 77 and through the other end 78 of the barricade leg. A second threaded nut 79 engages the outer end of the rod tightly to mount the light casing in position on the barricade. It is important to note that the offset squared portion of the bracket serves to maintain the light casing in upright position. The use of the nut and bolt arrangement in Figs. 15 to 18 has the inherent advantage that the securing and locking means may be tightened very securely, so as to simulate the condition where the light is an integral part of the barricade. This tightness of connection prevents undue motion of the light which would be possible if the light were loosely connected to the barricade. Such motion would be caused, for instance, by street vibration from any source, such as jack-hammers used for repairs, ordinary traffic, or the passage of heavy trucks. This type of movement has been found to decrease the life of warning lights. The tight connection with the barricade minimizes vibration and movement since the entire and much heavier structure moves to a much smaller degree than the lighter, loosely-connected lamp would. This advantage is obtainable in the structures shown in the remaining drawings by the judicious use of washers, as can be readily understood from Figures 3, 7, and 10. The use of a plurality of washers 26, Fig. 3, would give a similar result, but this particular advantage is best obtained by the nut and bolt type of construction shown in Figs. 15 to 18.

As best shown in Fig. 17, the nut 79 is intermediate its ends grooved to form a notch 80 of a size to receive therein the bolt 81 of a lock 82. When this lock has been placed snugly in position between the flanges of the leg portion 78 entirely to enclose the nut 79 and the bolt has been projected to engage this notch, it is found that the light casing is held securely locked in position on the barricade and that it cannot be removed therefrom until the bolt again is withdrawn from the nut. The notch 80 and the bolt 81 should be so shaped that manual prying away of the lock from the nut is not possible. At the same time, it is important so to shape the parts that the bolt 81 may be readily advanced into the notch and withdrawn therefrom. This may be done by cutting the outer surface 87 of the notch perpendicular to the axis thereof and sloping the surface 83 inwardly, substantially as shown in Fig. 17. The engaging end of the bolt 81 should, of course, be similarly shaped. The flush fitting together of several of the parts shown cooperate to provide the stable, snug securing together of the barricade and the lamp mentioned above. Flared-out portion A' of the light casing F abuts flange 73 and cooperates with the nut and bolt securing means to provide a stable, multi-point contact between the lamp and the barricade.

While I have hereinbefore described preferred forms of the invention, it is not intended thereby to limit the invention to the precise arrangements, proportions and shapes illustrated in the drawings, but I reserve the right to embody such further modifications as will fall within the scope of the claims hereto appended. It is, for example, to be understood that the modified form of light casing support illustrated in Figs. 15 to 18 may, if desired, be applied to the type of barricade illustrated in Fig. 1 of the drawings. It is also to be understood that a bolt may be substituted for the threaded rod 76 and the inner nut 72 seated thereon.

I claim:

1. The combination with a barricade including a pair of legs, each leg consisting of a channeled bar bent to form a broad base from which the ends of the bars extend upwardly and inwardly, the channeled bar being so oriented that the flanges are outwardly directed, the upper ends of the bar being vertically directed, a panel clamped in position therebetween, there being a passage horizontally through the ends of the bar and the said panel; of a light, a horizontally perforated bracket on one side surface of said light, said bracket being offset to form a squared seat having a passage through the middle thereof, the squared seat nesting within the channel and the sides of the squared seat engaging the flanges of the channel, a threaded nut seated within said offset portion of the bracket, and so engaging the bracket as to be non-rotatable therein, a threaded rod engaging said nut and extending through said passage, a second nut engaging the outer end of said rod and having a groove in its perimetrical surface intermediate its ends, and a lock mountable on said second nut, the lock having a bolt engaging the groove of the nut to lock the light in position on the barricade.

2. The combination with a barricade including a pair of legs, each leg consisting of a channeled bar bent to form a broad base from which the ends of the bars extend upwardly and inwardly, the upper ends of the bar being vertically directed and the flanges of the channeled bar being outwardly directed, a panel clamped in position therebetween, there being a passage horizontally through the ends of the bar and the said panel; of a light, a horizontally perforated bracket rigidly secured to one side surface of said light, said bracket being offset to form a squared seat having a passage through the middle thereof, the offset portion of the bracket being of a width to fit snugly between the flanges of one end of said bar, a threaded nut seated within said offset portion of the bracket, and so engaging the bracket as to be non-rotatable therein, a threaded rod engaging said nut and extending through said passage, and a second nut engaging the outer end of said rod and having a groove in its perimetrical surface intermediate its ends.

3. The combination with channeled bars and a panel between said bars, there being a passage horizontally through the bars and panel; of a light, a horizontally perforated bracket rigidly secured to one side surface of said light, said bracket being offset to form a squared seat flushly engaging the channel of one of said bars and having a passage through the middle thereof, a member extending through the bars and the panel, said member having a portion non-rotatably seated within said offset bracket portion, a nut engaging the outer end of said member and having a groove in its perimetrical surface intermediate its ends, and a lock mountable on said nut completely to cover the nut and to seat within the channel of the other bar, the lock having a bolt engaging the groove of the nut to lock the light in position on the bars and panel.

4. An assembly securing a warning light to a barricade comprising a barricade member provided with an aperture therethrough, an aperturned channel support member secured to the barricade member with the flat back of the channel positioned flush against the barricade member, an apertured bearing member positioned on the side of the barricade remote from the channel, the three apertures being in registration, and in combination therewith a lamp, said lamp comprising an outer casing with a flared-out body portion around its lower periphery, said flared-out body portion abutting the channel support member when the lamp is supported in the assembly, thereby providing a stable mounting for the lamp, fastening means non-rotatably secured on the outer casing and including a threaded receptive aperture, said means having parallel sides in contact with the inner sides of the flanges of the channel support member and thereby positioning the warning light relative to the barricade, and a bolt passing through the apertures and into the threaded receptive aperture in said fastening means.

5. Means for securing a casing to a support member comprising a bracket secured to the casing, the bracket comprising a wall having an aperture therein, and a pair of L-shaped elements, said elements being seatable within the bracket between the bracket wall and the casing in back-to-back relation so that one leg of each L-shaped element rests within the bracket and the backs of the elements protrude from said aperture, each back having an aperture remote from the element legs, the apertures in the backs being aligned, whereby the protruding backs may be inserted through an aperture in said support member and may be locked thereto, said support member being channeled and the casing being provided with means protruding into the channel between the flanges thereof adapted to prevent rotation of the casing relative to the support member.

JOHN W. SHAMEL.

References Cited in the file of this patent

UNITED STATES PATENTS

| Number | Name | Date |
| --- | --- | --- |
| 288,058 | Hollister | Nov. 6, 1883 |
| 807,189 | McCarthy | Dec. 12, 1905 |
| 1,370,585 | Hawthorne | Mar. 8, 1921 |
| 1,431,267 | Smith | Oct. 10, 1922 |
| 1,497,090 | Csandy | June 10, 1924 |
| 1,530,521 | Robinson | Mar. 24, 1925 |
| 1,548,620 | Lollis | Aug. 4, 1925 |
| 1,761,358 | Mitchell | June 3, 1930 |
| 1,802,995 | Williams | Apr. 28, 1931 |
| 1,831,798 | Alsaker | Nov. 17, 1931 |
| 2,117,884 | Hapman | May 17, 1938 |
| 2,456,792 | Ohm | Dec. 21, 1948 |
| 2,614,471 | Markowitz | Oct. 21, 1952 |

FOREIGN PATENTS

| Number | Country | Date |
| --- | --- | --- |
| 418,914 | England | May 23, 1934 |